United States Patent [19]
Clutter et al.

[11] 3,922,476
[45] Nov. 25, 1975

[54] LIVE LINE POLE TOP COVER

[75] Inventors: Melvin E. Clutter, Centralia; Edward L. West, Sturgeon, both of Mo.

[73] Assignee: A. B. Chance Company, Centralia, Mo.

[22] Filed: Mar. 6, 1975

[21] Appl. No.: 555,876

[52] U.S. Cl............ 174/5 R; 150/52 R; 174/45 R
[51] Int. Cl.² ............... H02G 1/02; H01B 17/00
[58] Field of Search ...... 174/5 R, 45 R, 138 F, 139; 52/301; 150/52 R

[56] References Cited
UNITED STATES PATENTS

| 914,042 | 3/1909 | Harrison et al. ............... 174/5 R |
| 1,469,989 | 10/1923 | Bush ............................... 174/5 R |
| 2,682,591 | 6/1954 | Killian ..................... 174/138 F UX |
| 2,946,841 | 7/1960 | Wagner........................... 174/139 |
| 3,328,511 | 6/1967 | Cagle et al..................... 174/5 R X |

OTHER PUBLICATIONS
Electrical World, Oct. 14, 1968, p. 73.

*Primary Examiner*—Laramie E. Askin
*Attorney, Agent, or Firm*—Schmidt, Johnson, Hovey & Williams

[57] ABSTRACT

A vertically adjustable, flexible, openable insulative utility pole top cover is disclosed which is especially adapted for temporarily covering the upper end of a utility pole having upright, side-mounted insulator-supporting pins attached thereto in order to facilitate work around the pole. The cover comprises a pair of opposed, complementally configured, interconnected synthetic resin sections cooperatively defining a closed-top interior space for receiving the end of a utility pole, with elongated spaces adjacent the closed top for surrounding insulator-supporting pins or other pole hardware. An elastic rope is preferably used to tensionally draw the sections together and permit alteration of the vertical disposition of the cover as needed.

11 Claims, 5 Drawing Figures

U.S. Patent  Nov. 25, 1975  3,922,476
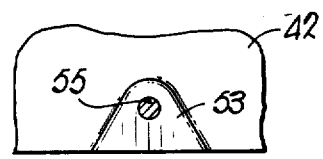
*Fig. 5.*
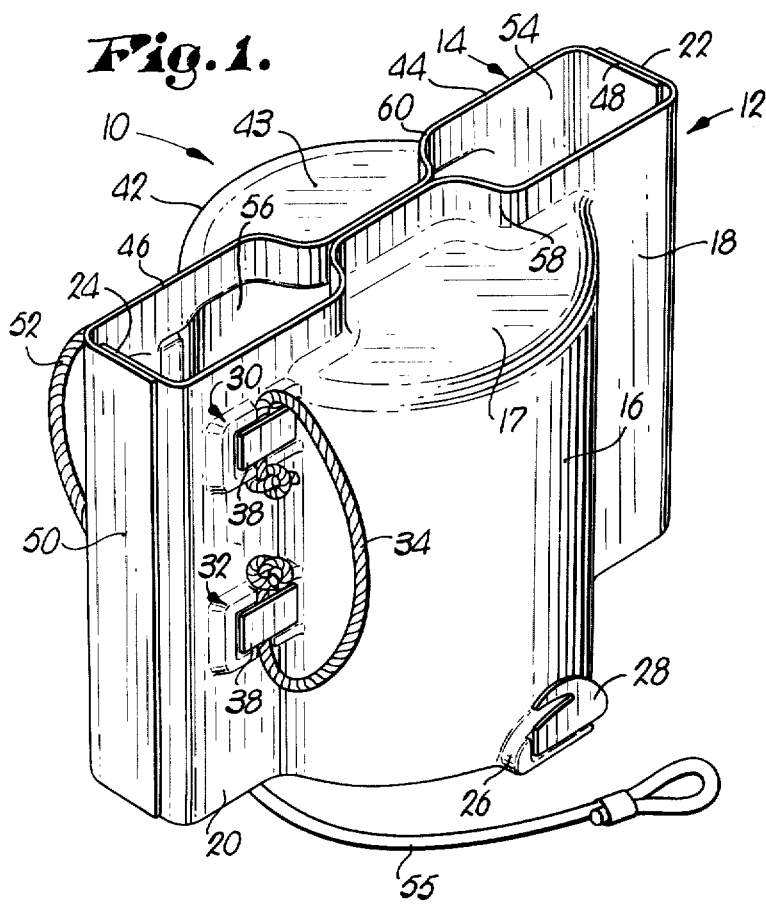
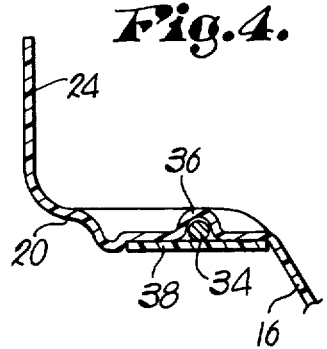
*Fig. 4.*
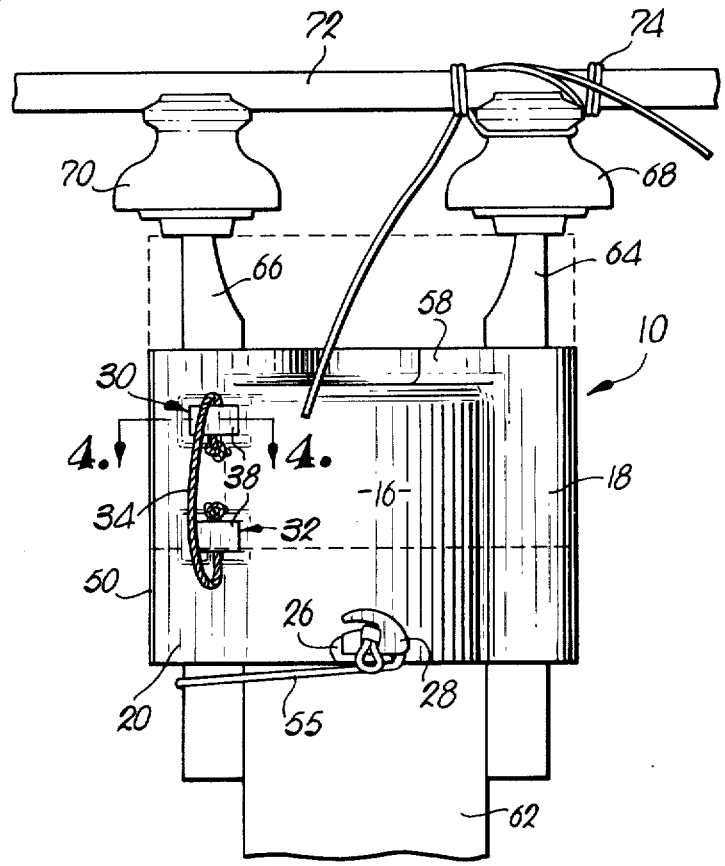
*Fig. 3.*
*Fig. 2.*

LIVE LINE POLE TOP COVER

This invention relates to insulative utility pole top covers of the type utilized to temporarily cover and protect the top of a utility pole when work on proximal energized conductors must be performed. More particularly, it is concerned with a closed top, flexible, openable cover which maximizes the protective function of the device and moreover provides openings for upright, insulator-supporting pins to permit use thereof on specialized varieties of poles and thus eliminate the need of rubber blankets or the like which have heretofore been utilized in these applications.

Pole top covers or other cover-up equipment are conventionally used when work must be done on energized conductors supported by an armless or other type of utility pole assembly. The purpose of such covers is to provide an insulative barrier between the grounded surfaces of the pole top and any potentially energized surfaces such as the conductor, tie wires, tools or linemen. As can be appreciated, without such protection a hazard is presented because of the possibility that the energized line or equipment could contact the grounded pole. This in turn prevents the linemen from working with their usual freedom of movement and speed because of the constant fear of contact with the poles. Hence, in order to ensure safe, efficient working conditions around energized lines supported by utility poles, the latter are customarily temporarily insulated, preferably by a single device which can be quickly positioned and removed manually or with conventional hot-line tools.

The practice in the past has been to cover the pole top with a simple cylindrical pole cover or a number of rubber blankets which are simply draped over the area to be protected. In the case of cylindrical covers, there is no provision made for the type of construction wherein one or more upright, insulator-supporting pins are attached to the side of the utility pole adjacent the top thereof. With this type of construction simple cylindrical covers cannot be utilized, thus necessitating employment of less desirable rubber insulating blankets. The latter are troublesome in that they are difficult to properly position and manipulate with hotline equipment, and moreover can be moved or blown completely off a pole top, during windy conditions, thus exposing the grounded pole top. In addition, simple cylindrical covers are less than desirable because they do not generally present a closed-top configuration, and thus expose a potentially dangerous area on the pole immediately adjacent the work area.

It is therefore the most important object of the present invention to provide an insulative, closed-top pole top cover which more completely protects against the possibility that energized equipment will contact the grounded pole, and moreover is usable on most types of pole constructions, including those utilizing upright insulator-supporting pins or other side-mounted pole hardware in order to completely obviate the need for insulative rubber blankets or the like.

Another aim of the invention is to provide a pole top cover having attachment structure thereon for releasably positioning the cover on the pole in order to withstand untoward wind conditions or the like while also permitting vertical adjustment of the cover as needed in order to meet specialized protective requirements.

A still further object of the invention is to provide a cover of the type described comprised of a pair of flexible, opposed, interconnected, open-bottom cover sections cooperatively defining a central, closed-top pole-receiving space, with parallel, tubular openings adjacent the pole-receiving space for receiving insulator-supporting pins or other side-mounted pole hardware to thereby effectively protect linemen or others working in the proximity of the pole from the hazards of electrical shock.

IN THE DRAWING

FIG. 1 is a perspective view of the pole top cover of the present invention;

FIG. 2 is an end elevational view of the cover shown in FIG. 1;

FIG. 3 is a side elevational view of the pole top cover of the invention, shown mounted upon a utility pole having a pair of upright side-mounted, insulator-supporting pins attached thereto;

FIG. 4 is a fragmentary, sectional view taken along line 4—4 of FIG. 3; and

FIG. 5 is a fragmentary, side elevational view illustrating the connection of the elastic draw rope to one of the cover sections.

The pole top cover 10 of the present invention is shown perspectively in FIG. 1 and broadly includes a pair of opposed, complementally configured, interconnected cover sections 12 and 14, each composed of yieldable, brightly colored, insulative synthetic resin material.

Section 12 is an integral, elongated member having a central generally semicylindrical section 16 which includes a top wall 17 and a pair of opposed, laterally extending sidewalls 18 and 20 extending therefrom. Sidewalls 18 and 20 each terminate in perpendicularly oriented lip portions 22 and 24 respectively, as best illustrated in FIG. 1. Semicircular section 16 has an arcuate extension 26 at the lowermost end thereof, with a slotted retainer 28 attached thereto. Additionally, sidewall 20 includes two pairs of vertically spaced protrusions 30 and 32 in the outer face thereof which are configured and arranged to receive the respective knotted ends of rope handle 34. As best illustrated in FIG. 4 a rope-receiving channel 36 is defined between each pair of protrusions 30 and 32, and a small hold-down plate 38 is bonded across the respective protrusion pairs 30 and 32 for the purpose of holding the knotted ends of rope handle 34 in place.

Opposed section 14 is identical in most respects with section 12 and includes a complemental, central, generally semicylindrical section 42 having a top wall 43 to thereby cooperatively define with opposed semicylindrical section 16 a central, closed-top, cylinderical pole receiving space within cover 10. A pair of laterally extending sidewalls 44 and 46 extend from section 42 and the latter terminate in perpendicular lip portions 48 and 50 respectively. Sidewall 46 also includes a rope handle 52 which is attached to the latter in a manner identical with that described in connection with handle 34. Section 42 has a lowermost extension 53 with an elastic rope 55 connected thereto of length to extend around a utility pole and be releasably secured within the slot of retainer 28.

It will be seen that sections 12 and 14 are positioned in an opposed, complemental relationship such that lip portions 22 and 48 overlap. In this regard, the portions 22 and 48 are adhesively secured together by conventional adhesive means to present a hinge like end such that cover 10 can be opened by grasping handles 34 and 52 and pulling sections 12 and 14 apart. Moreover, it will be seen that the opposed sidewalls 18 and 44 of sections 12 and 14 are in spaced relationship to cooperatively define therebetween a space 54. The latter extends the entire length of cover 10 and is adjacent and parallel with the central, generally cylindrical pole-receiving space defined by the opposed semicylindrical sections 16 and 42.

Similarly, lip portions 24 and 50 at the remaining ends of sections 12 and 14 are in closely fitting, slidable engagement in order to normally close the openable end of the cover. Respective opposed sidewalls 20 and 46 are also in spaced relationship to define another space 56 identical with space 54 adjacent the central portion of the cover.

It should also be noted that the upper margin of both of the sections 12 and 14 is defined by upright lips 58 and 60. The latter are in abutting engagement at the center area of cover 10 in order to enhance the protective function of cover 10 at this critical area by keeping tie wires on tools out of contact with proximal grounded surfaces.

Turning now to FIG. 3, the cover of the present invention is shown in an operative disposition on a utility pole construction. The latter includes an upright utility pole 62 having a pair of upstanding, metallic, insulator-supporting pins 64 and 66 attached thereto at respective sides. Pin-type insulators 68 and 70 are secured atop the respective pins 64 and 66 and the insulators are grooved for the reception of an elongated conductor 72. A conventional line tie 74 is also illustrated in the Figure, shown during installation thereof when cover 10 would be most needed.

In the use of cover 10 during installation of such a line tie, the respective rope handles 34 and 52 are grasped either manually or through the use of hot-line tools, and the device 10 is opened by separating the opposed sections 12 and 14. This permits positioning of the cover about pole 62 and pins 64 and 66, whereupon the opposed sections can be reclosed with the central area of the cover receiving the upper extremity of pole 62. At this point the elastic rope 55 is drawn about the pole and inserted within the slot of retainer 28 in order to tensionably position cover 10 in place on the pole. In this orientation, work can proceed without fear that the energized line will come into contact with grounded pole 62 through accidental contact with line tie 74.

In other instances, it may be advantageous to shift cover 10 upwardly in order that the upper margin thereof is in engagement with the underside of the insulators 68 and 70. This orientation is depicted in phantom in FIG. 3. During such vertical adjustment it is only necessary to loosen elastic rope 55, shift the cover upwardly, and retighten the rope in order to hold the cover in position. This feature is important in that vertical adjustment of the cover is possible without fear that the cover will be shifted or completely blown away during high-wind conditions. Furthermore, the provision of a closed top reception space for pole 62 enhances the protective function of the device, notwithstanding the fact that the cover can be utilized on pole constructions having conventional upright insulator-supporting pins.

Having thus described the invention, what is claimed as new and desired to be secured by Letters Patent is:

1. A pole top cover, comprising:
   a pair of opposed, open bottom cover portions formed of electrical insulating material presenting an openable pole top cover,
   said portions being configured to cooperatively define a space therebetween for receiving the upper end of a utility pole and having top segments configured for covering the top of said pole,
   said portions also being configured to cooperatively define an opening in the upper end thereof adjacent said top segments for receiving an insulator-supporting pin attached to said upper end; and
   means on said cover for releasably drawing said portions together to position said cover on said upper end and hold the same at any one of a number of vertical dispositions on the pole.

2. The pole top cover as set forth in claim 1, wherein said portions are separate cover sections joined together.

3. The pole top cover as set forth in claim 2, wherein said sections are joined together at one of the adjacent lateral ends thereof.

4. The pole top cover as set forth in claim 2, wherein the respective lateral ends of said cover are defined by overlapping segments of said opposed sections, one pair of said overlapping segments being joined together.

5. The pole top cover as set forth in claim 1, wherein said top segments are configured to abut and cooperatively cover said pole top when the cover is installed thereon.

6. The pole top cover as set forth in claim 1, wherein said cover portions define a pair of spaced openings adjacent said top segments.

7. The pole top cover as set forth in claim 6, wherein said portions define enclosed spaces communicating with said openings and the open bottom of said cover, respectively.

8. The pole top cover as set forth in claim 1, wherein the uppermost margin of each of said portions is defined by a continuous, upright lip.

9. The pole top cover as set forth in claim 1, wherein said drawing means comprises an elastic rope attached to one of said portions and of length to be drawn around a utility pole, with retainer means on the other of said portions for releasably holding said rope in a drawn condition.

10. The pole top cover as set forth in claim 1, including handle means adjacent the openable end of said cover.

11. The pole top cover as set forth in claim 1, wherein said portions are formed of yieldable synthetic resin material.

* * * * *